United States Patent [19]
Ouimet et al.

[11] Patent Number: 6,094,641
[45] Date of Patent: Jul. 25, 2000

[54] METHOD FOR INCORPORATING PSYCHOLOGICAL EFFECTS INTO DEMAND MODELS

[75] Inventors: Kenneth J. Ouimet, Sacramento; Charu V. Chaubal, Fair Oaks, both of Calif.

[73] Assignee: KhiMetrics, Inc., Sacramento, Calif.

[21] Appl. No.: 09/084,157

[22] Filed: May 21, 1998

Related U.S. Application Data

[60] Provisional application No. 60/050,917, May 21, 1997, and provisional application No. 60/049,825, May 21, 1997.

[51] Int. Cl.$^7$ .................................................... G06F 17/60
[52] U.S. Cl. .................................... 705/10; 705/1; 705/7; 705/14; 705/16
[58] Field of Search ............................... 705/1, 7, 10, 14, 705/16; 463/9

[56] References Cited

U.S. PATENT DOCUMENTS

| | | | |
|---|---|---|---|
| 5,057,915 | 10/1991 | Von Kohorn | 463/9 |
| 5,168,445 | 12/1992 | Kawashima et al. | 705/10 |
| 5,227,874 | 7/1993 | Von Kohorn | 705/10 |
| 5,377,095 | 12/1994 | Maeda et al. | . |
| 5,459,656 | 10/1995 | Fields et al. | . |
| 5,490,060 | 2/1996 | Malec et al. | 705/10 |
| 5,515,270 | 5/1996 | Weinblatt | 705/14 |
| 5,712,985 | 1/1998 | Lee et al. | 705/7 |
| 5,918,211 | 6/1999 | Sloane | 705/16 |

OTHER PUBLICATIONS

"Forecasting And Analysis Of Marketing Data Using Neural Networks: A Case Of Advertising And Promotion Impact" By Poh et al., 1995 IEEE (1043–0989/95), pp. 224–230.
"Promoman", Promotion Management System, Nielsen Marketing Research, 1992.
"The Robustness Of Retail–Level Price Elasticity Estimates" By Ruth N. Bolton, Journal of Retailing, vol. 65, No. 2, Summer 1989.
"Competing On Price: The Role Of Retail Price Advertisements In Shaping Store–Price Image" By Cox et al., Journal of Retailing, vol. 66, No. 4, Winter 1990.
"Reassessing Brand Loyalty, Price Sensitivity, And Merchandising Effects On Consumer Branch Choice" By Allenby et al., Journal of Business & Economic Statistics, Jul. 1955, vol. 13, No. 3.
"Increased Consumer Sales Response Though Use Of 99–Ending Prices" By Schindler et al., Journal of Retailing, vol. 72(2), pp. 187–199.
A test of the theory of reference–dependent prefrences. Quarterly Journal of Economics, May 97, vol. 112 Issue 2, p479,27p, 5 charts, 4 graphs, May 1997.
Preparing for the Next Business Downturn: How Managers Can Hedge Against the Risks of Future Recession., Review of Business, vol. 16, No. 1, Summer/Fall 1994, pp. 21–26.
Uncertain Outlook On World Egg Market, Agra Europe, pN/A, Oct. 2, 1992.
The Price Knowledge And Search Of Supermarket Shoppers. By, Peter R. Dickson & Sawyer, Journal of Marketing, vol. 54 (Jul. 1990) 42–53.
Estimating Recreation Demand For Lake Erie Chaterfishing (Ohio), By, Mohammad, Golam. Dissertation, 1989, The Ohio State University. vol. 50/12–A Of Dissertation Abstracts International. p. 4099. 159 Pages.

*Primary Examiner*—Allen R. MacDonald
*Assistant Examiner*—M. Irshadullah
*Attorney, Agent, or Firm*—Graham & James LLP

[57] ABSTRACT

A method for incorporating psychological effects into a demand model for pricing. First the original demand model is modified to include a mechanism to convert actual prices into perceived prices, thus causing the demand model to predict higher demand for certain prices. The user specifies the function that converts from real prices to perceived prices. This modified demand function is then fitted to a sales history to yield the parameters appropriate to its particular form. Also, the demand model can be modified to account for promotional effects. The user defines a visibility model, which gives the relative increase in demand for an item caused by a promotion, and the cost of the promotion. The demand model is modified to include the effect of increased demand based on the visibility, and a profit model is modified to account for the added cost due to the added visibility. The profit model is then optimized with respect to both prices and promotions.

21 Claims, 10 Drawing Sheets

Select Models

>2

Select Demand Model
    1. Select Predefined Demand Model
    2. Define New Demand Model $$>q = q_i^0 \exp(-g_i (p_i / p_i^0))$$

Select Perceived Pricing Model
    3. Select Predefined Perceived Pricing Model
    4. Define New Perceived Pricing Model Select Visibility Model
    5. Select Predefined Visibility Cost Model
    6. Define New Visibility Cost Model     Q. Return to Main Menu

| $\eta = 0.04; D_{MAX} = \$1.00$ | | | $\$1.99$ | $\$2.00$ | $\$2.19$ | $\$2.20$ | $\$2.49$ |
|---|---|---|---|---|---|---|---|
| | | | | | | | |
| 1 | $\$0.01$ | 0.816 | 9 | | 9 | | 9 |
| 2 | $\$0.10$ | 0.908 | 4 | | 1 | 2 | 4 |
| 3 | $\$0.50$ | 0.972 | 1 | | | | |
| 4 | $\$1.00$ | 1.000 | 1 | 2 | 2 | 2 | 2 |
| | | | 1.9226 | 2.000 | 2.1642 | 2.1816 | 2.4366 |

| P = $2.20 | |
|---|---|
| | $\rho = \sum_u N_u D_u \Gamma_u$ |
| | $\rho = 2 \times \$0.10 \times 0.908 + 2 \times \$1.00 \times 1.000$ |
| | $\rho = 2.182$ |

|   | $1.99 | $2.00 | $2.19 | $2.20 | $2.49 |
|---|---|---|---|---|---|
|   |   |   |   |   |   |
| 1 | 5.9% | $1 | $2 | $2 | $2 | $2 |
| 2 | 42.4% | $1.9 | $2.0 | $2.1 | $2.2 | $2.4 |
| 3 | 51.7% | $1.99 | $2.00 | $2.19 | $2.20 | $2.49 |
|   | ρ | 1.894 | 2.000 | 2.141 | 2.188 | 2.423 |

Figure 9

| P = $1.99 | |
|---|---|
| | $\rho = \sum_u P_u W_u$ |
| | $\rho = (5.9\% \times \$1) + (42.4\% \times \$1.9) + (51.7\% \times \$1.99)$ |
| | $\rho = 1.894$ |

Figure 10

| Promotion | Visibility | Cost |
|---|---|---|
| Shelf sign | 1.3 | $1.50 |
| Small Newspaper ad | 1.8 | $9.31 |
| Large Newspaper ad | 2.1 | $37.60 |

Figure 11

| Item | Price | Visibility |
|---|---|---|
| 1 | $1.49 | 1.3 |
| 2 | $2.29 | 1.8 |
| 3 | $4.69 | 2.1 |
| 4 | $1.99 | 1.4 |
| 5 | $2.49 | 2.2 |

Figure 12

METHOD FOR INCORPORATING PSYCHOLOGICAL EFFECTS INTO DEMAND MODELS

CROSS-REFERENCE TO RELATED APPLICATIONS

This application claims the benefit of U.S. Provisional Application No. 60/050,917, filed May 21, 1997, and U.S. Provisional Application No. 60/049,825, filed May 21, 1997, both of which are specifically incorporated herein, in their entirety, by reference.

BACKGROUND OF THE INVENTION

1. Field of the Invention

The present invention relates to demand models, and more particularly, to software that incorporates psychological factors into consumer demand models.

2. Description of Related Art

Present pricing methods, while taking into account a tremendous amount of information, ultimately depend upon a pricing analyst's expert intuition for setting prices. This reliance on a human entails a slow and qualitative pricing process. Even if this intuition could be captured by an expert system, it would still lack the quantitative description necessary to actually optimize prices. Businesses are being faced with an increasingly competitive and sophisticated environment, leading to lower margins and a stronger focus on pricing. The need for more rigorous, model-based approaches to pricing is becoming more urgent.

There are, however, problems with the use of model-based decision-making tools. As the decision-making process is automated, the operational decisions that are recommended by the model may deviate from the decisions of experienced pricing managers. One reason is that pricing managers usually consider the psychological effects that their decisions will have on consumers. For example, pricing managers know that a buyer's perception of a price is very important, and they intuitively incorporate this knowledge into their pricing. For example, there will be far more items in a retail store priced at $1.99, than priced at $2.00. This phenomenon is often referred to as a price threshold.

Another factor that impacts heavily on a buyer's psychological view of the marketplace is promotional activity. Vast amounts of money are spent on a whole range of promotions, from coupons to advertisements to commercials. The effect of promotions on the sales of an item has been studied extensively, but these promotional decisions are rarely addressed within the broader context of the whole value chain.

SUMMARY OF THE INVENTION

The present invention provides a method for incorporating psychological effects such as price thresholds and promotional activity into a demand model. In a preferred embodiment of the present invention, software is used to implement a demand model that is modified to include the price threshold. One advantage of the present invention is that any demand model may be used, as the invention modifies only the price variable in the demand model, leaving the other parts untouched. The modified demand model can be used anywhere that an unmodified demand model would be used, for example, in a forecasting system. A particularly important use is as part of a price optimization routine, where the model is tuned to a sales history and then used to generate predicted optimal prices.

The demand model can be further modified to account for promotional effects. This is accomplished by making use of a novel concept called "visibility," which is defined as the amount by which the demand for an item is increased when a given promotion is run. Associated with each promotion is a visibility, which in general can be determined from empirical study, and a promotional cost, i.e., the amount of money spent on the promotion. By including the visibility in the demand model and also taking into account the promotional cost, the pricing and promotional decisions can be optimized together such that an optimized maximum profit can be obtained. For example, the method of the present invention could be utilized to determine both an optimum price and an optimum promotional activity, such as a newspaper ad, for a given item so that the highest profits could be obtained. In addition to sales of items, the above techniques can be applied to the sale of services.

DETAILED DESCRIPTION OF PREFERRED EMBODIMENTS

The following description is present to enable one of ordinary skill in the art to make and use the invention and is provided in the context of a patent application and its requirements. Various modifications to the illustrated embodiments will be readily apparent to those skilled in the art and the generic principles herein may be applied to other embodiments. Thus, the present invention is not intended to be limited to the embodiments shown but is to be accorded the widest scope consistent with the principles and features described herein.

The present invention provides a computer-implemented method for incorporating psychological effects such as price thresholds and promotional activity into a demand model. In a first preferred embodiment, a retailer utilizes collected point-of-sale data (hereinafter "sales data") to predict the consumer demand of its retail products. The retailer selects an appropriate consumer demand model which is modified to incorporate the psychological effects that various pricing and promotional decisions have on consumers. The modified demand model is then tuned to the sales data, and can be used anywhere an unmodified demand model would be used, for example, in a price optimization routine.

Figure 1:
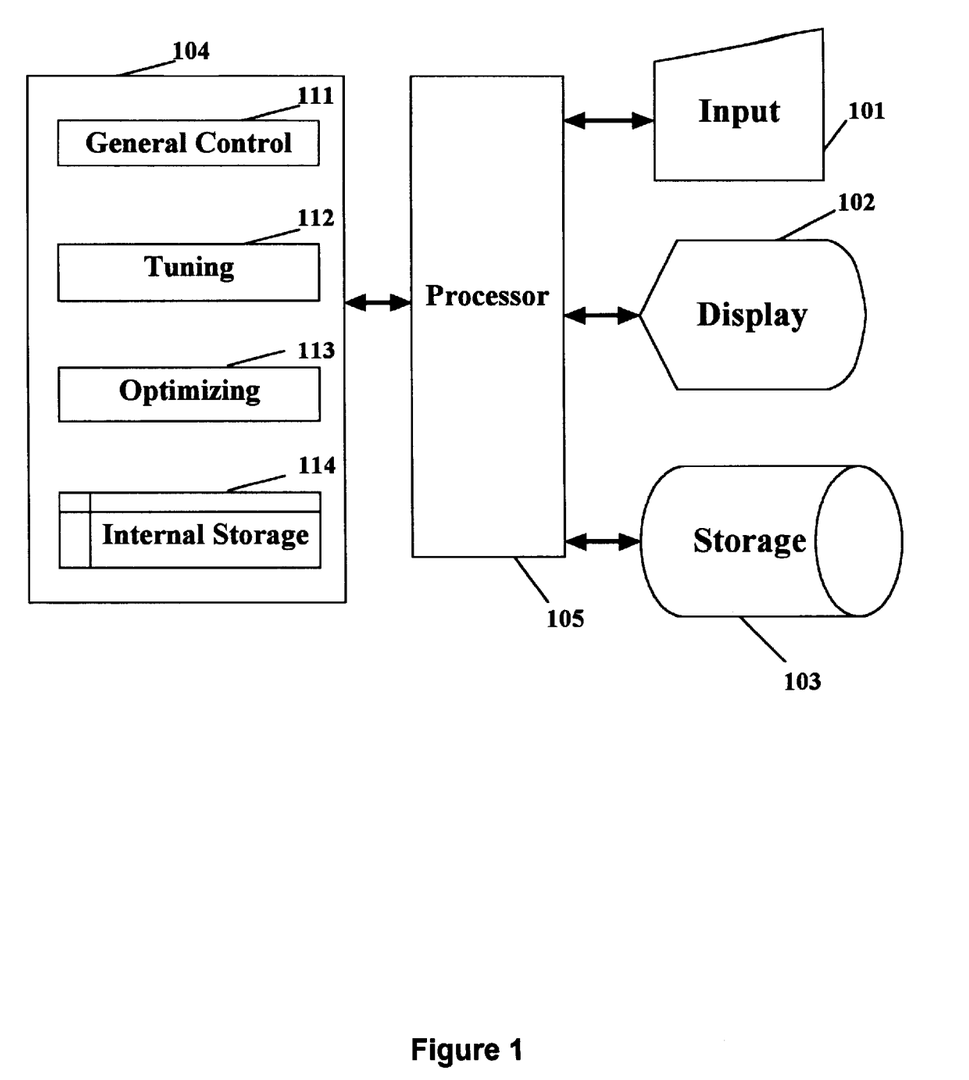
FIG. 1 is a high-level block diagram of a general-purpose computer system used in accordance with the present invention.

The operation of a first preferred embodiment of the present invention will be described with respect to a sample application in retailing; however, it is to be understood that the present invention can be applied to any situation where the modeling of consumer demand is utilized. As shown in FIG. 1, in a first preferred embodiment of the present invention, a system includes: an input device 101 such as a keyboard, through which a user enters commands, inputs functions, etc.; a display device 102 for displaying tables, etc.; a storage device 103 such as hard disk drive for storing results; a memory 104 for storing program instruction, tables and results; a processor 105 for performing various kinds of processing and controlling the overall operation of the system.

The memory 104 includes: a general control portion 111 for storing program instructions for controlling the overall operation of the system; a Tuning portion 112 for performing the tuning of a modified demand model; an Optimizing portion 113 for generating optimized prices; an internal storage portion 114 for storing data necessary for the various routines.

It will be understood that the described embodiments of the present invention are embodied as computer instructions stored in memory 104 and executed by processor 105. These instructions can also be stored on a computer readable medium, such as a floppy disk, CD ROM, etc., and can also be transmitted in a network such as the internet, an intranet, etc., via a carrier wave embodying the instructions.

Operation of the System

Figure 3:
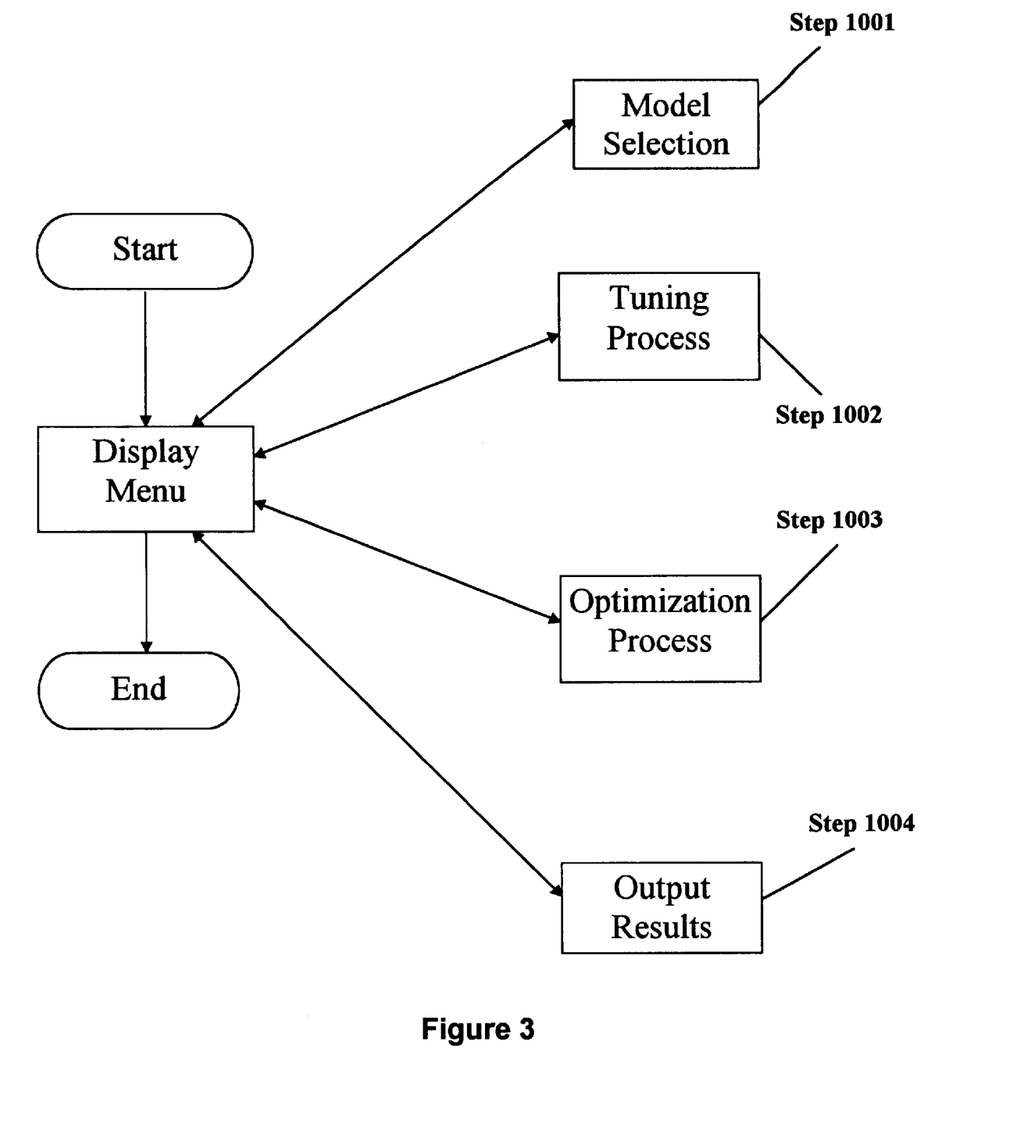
FIG. 3 is a flowchart describing the overall operation of a preferred embodiment of the system.
Figure 4A:
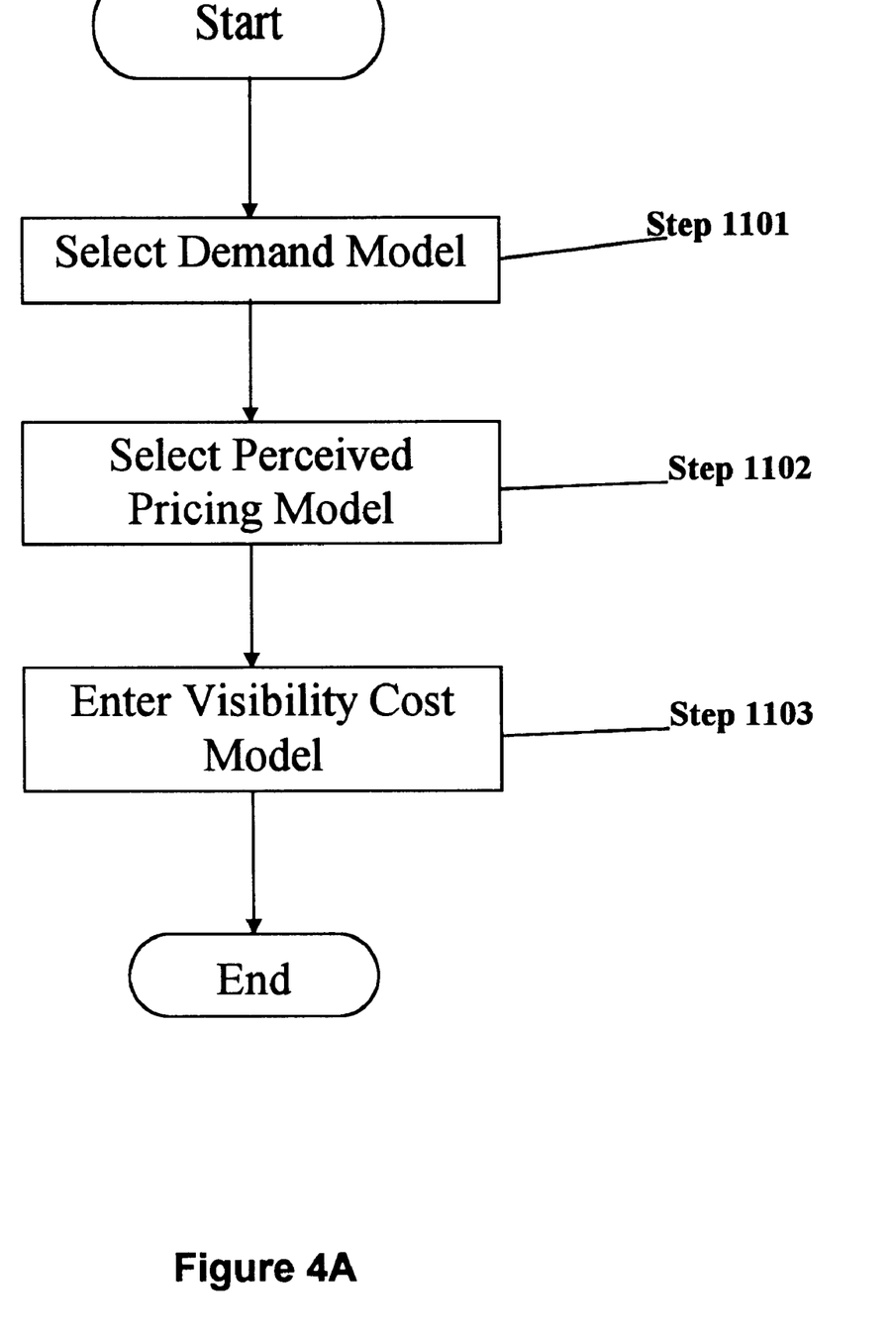
FIG. 4A is a flowchart of a preferred embodiment of the Model Selection routine.
Figure 4B:
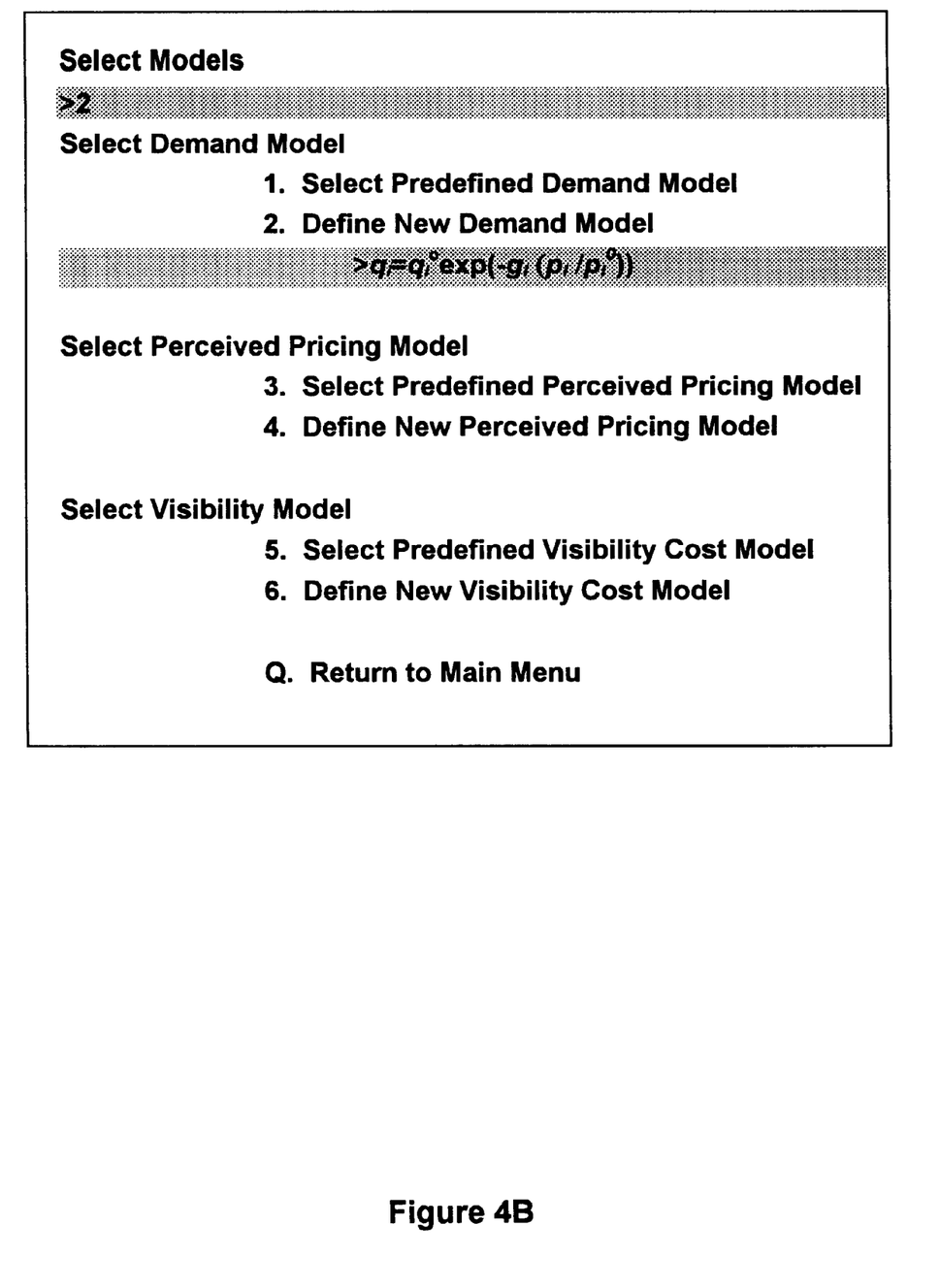
FIG. 4B is a picture of an example of possible user input displayed on the display device for the Model Selection routine.
Figure 5:
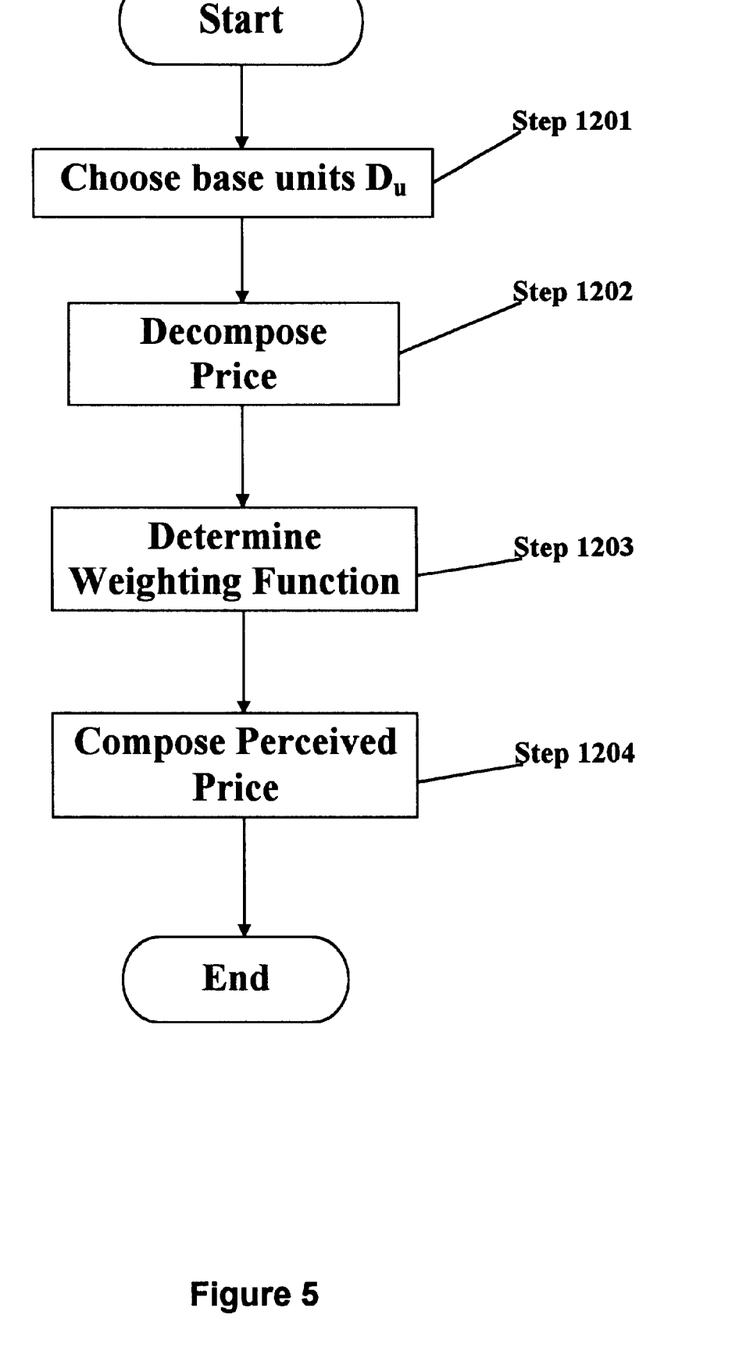
FIG. 5 is a flowchart of a first preferred embodiment of a routine for incorporating perceived prices into a demand model.

The operation of a first preferred embodiment of the present invention will be described in brief with reference to FIGS. 2 and 3 before being described in detail with reference to FIGS. 4 to 6.

Figure 2:
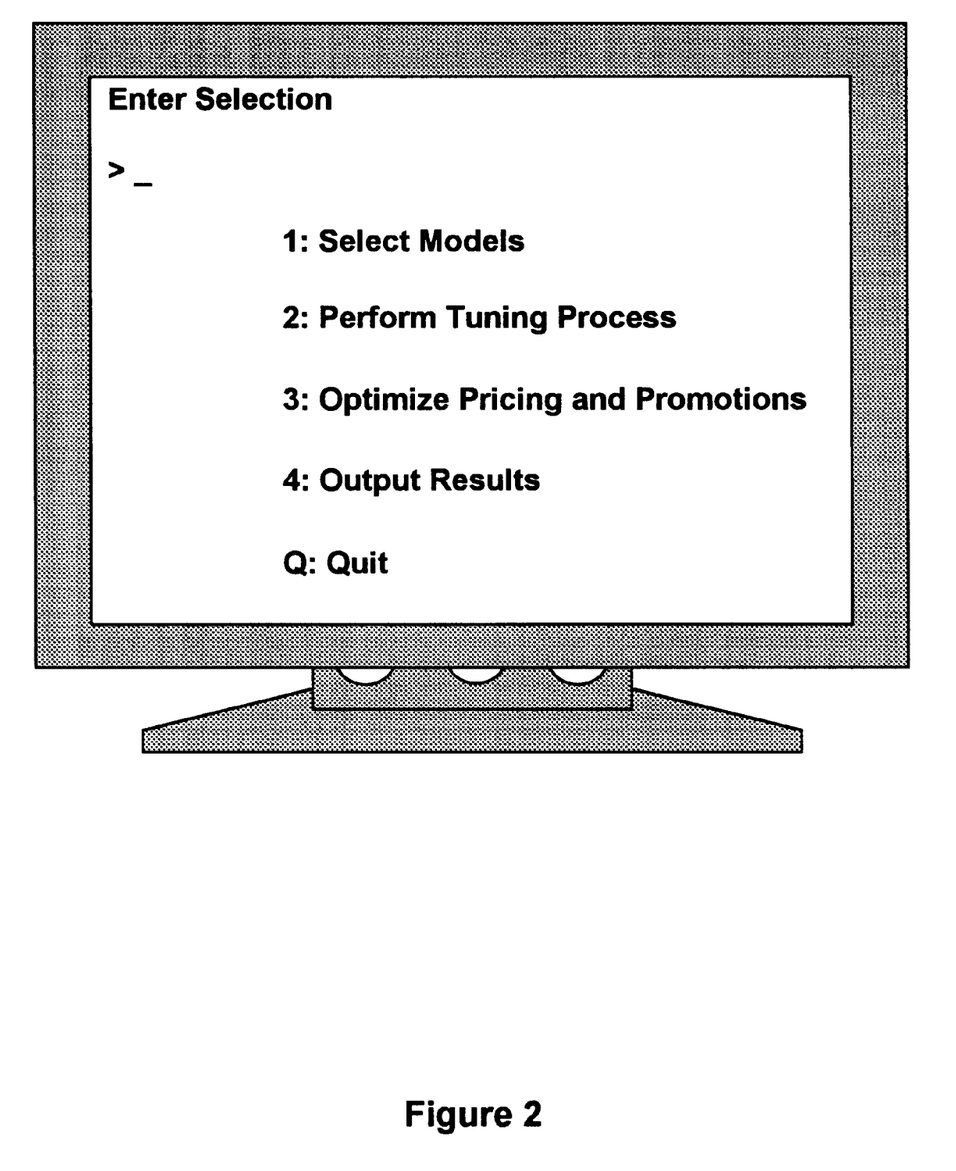
FIG. 2 is a picture of an example of an input menu displayed on the display device.

In the first preferred embodiment, a retailer seeking to utilize a demand model to analyze pricing decisions is shown a menu on the display device 102 as illustrated in FIG. 2. At this time the user enters one of the following selections through the input device 101: '1' to select models, '2' to perform the tuning process, '3' to perform the optimization of prices and promotional decisions, '4' to output results to the storage device 103, and 'Q' to terminate use of the system. Other appropriate methods and formats of input can, of course, be used.

The processor 105 receives the entered information, and the situation of the system is passed to one of the appropriate steps described below, according to the inputted value. This is represented schematically in FIG. 3.
(Step 1001): Model Selection
At this step, the user first selects a consumer demand model to be tuned to the sales data. Next, the user selects a perceived pricing model (i.e., a model that predicts the psychological effects that given prices have on consumers), and then a visibility model (i.e., a model that predicts the psychological effects that given promotions will have on consumers), these models will be described in detail below. The details of a preferred embodiment of the Model Selection routine will be discussed below in conjunction with FIGS. 4A and 4B.
(Step 1002): Tuning Process
At this step, the selected demand model is modified with the selected perceived pricing model and the selected visibility model. This modified demand model is then tuned to the sales data. It will be appreciated by those having ordinary skill in the art that a retailer can utilize this tuned demand model to make pricing and promotion decisions that are consistent with the psychological effects that those decisions will have on consumers. The details of a preferred embodiment of this routine are discussed below.
(Step 1003): Optimization Process
At this step, the parameters of the modified demand model are used to generate a set of optimized prices and promotional decisions.
(Step 1004): Output Results
The optimized prices and promotional decisions are outputted to the external storage device 103, from which they may be accessed for implementation by an appropriate user.

Model Selection

A preferred embodiment of this routine will be described with reference to FIGS. 4A and 4B. The user is presented with a menu on the display 102, such as illustrated in FIG. 4B, to prompt the user through the Model Selection routine as illustrated in FIG. 4A. It should be appreciated that other appropriate methods and formats of input can, of course, be used, and that the simplified menu of FIG. 4B is presented for illustrative purposes only.
(Step 1101)
The user enters a demand model to predict sales. Consumer demand models are known in the art, and in a preferred embodiment, the user will be provided with a database of predefined demand models from which to choose. It is also contemplated, as illustrated in FIG. 4B, that the user will be given the option of defining a new demand model, allowing the user to tailor a model to meet the user's specific needs. In general a demand model $q=q(p; X)$ gives the predicted sales q of an item based upon its price p and possibly other factors X. The demand model illustrated in FIG. 4B is a one-dimensional model that determines the demand for an item i based solely upon operational variables affecting item i, such as price p; however, it should be appreciated that the present invention can be utilized with any demand model, for example, one that incorporates the price of other items, the sales history of selected items, etc.
(Step 1102)
Next, the user selects a perceived pricing model, which is utilized to predict the perceived prices—i.e., the prices that account for the price threshold phenomenon. In a preferred embodiment, the user will be provided with a database of predefined perceived pricing models from which to choose, and will also have the option of defining a new perceived pricing model. Further, the perceived pricing model of a preferred embodiment will be represented as a function having the form $\rho(p; B_{1 \ldots N})$. This function depends upon the original price p as well as a number of parameters $B_{1 \ldots N}$; two preferred embodiments of the perceived pricing model will be discussed below.
(Step 1103)
Next, the user selects a visibility model, which measures the change in demand of an item due to various levels of promotion of that item. In a preferred embodiment, the user will be provided with a database of predefined visibility models which are constructed from the sales history, and will also have the option of defining a new visibility model. Further, the visibility model of a preferred embodiment will be represented as a visibility cost function having the form $c_v(V)$, which gives the cost that a promotion incurs, as a function of the visibility, denoted as V. This quantity is defined as the increase in demand that a promotion incurs, relative to the demand without promotion. A preferred construction of the visibility cost function is described below.

Tuning Process

A preferred embodiment of the Tuning Process will now be described. The original demand model having the general form $q=q(p; X)$ as given above, is modified to incorporate the psychological effects associated with perceived prices and visibility. The modified demand model will have the form $$q=Vq(\rho(p; B_{1\ldots N}); X)$$

This modified demand model is then fitted to a sales history, as would be done with a ordinary demand model. However, in addition to fitting the parameters X from the original demand model, the parameters $B_{1\ldots N}$ from perceived pricing model are also fitted.

As shown above, the visibility is also used to modify the sales history according to the promotional activity that was occurring at the time of the sale. However, often times information on the promotional activity associated with an item is not available, at least not in a form suitable for analysis. In this case, the tuning may be performed using the perceived pricing process, using the following modified demand model:

$$q=q(\rho(p; B_{1\ldots N}); X)$$

This tuning may be performed using any standard fitting technique, such as the chi-squared method; such fitting techniques are well known in the art.

Optimizing Process

A user can utilize the fitted, modified demand model from the Tuning Process to determine the price for each item that will maximize profits. As known in the art, profits can be maximized by optimizing a profit function having the general form:

$$\prod = \sum_i q_i(p_i; X_i)[p_i - c_i]$$

However, in order to incorporate the perceived prices and visibility, the above objective function is modified with the modified demand function to yield a modified objective function, which has the following general form:

$$\prod = \sum_i V_i q_i(\rho(p_i); X_i)[p_i - c_i] - c_{vi}$$

The independent variables that the profit $\pi$ depends upon are the price $p_i$ for each item and the visibility $V_i$ for each item. Thus, in addition to optimizing the price p, the optimization routine can also optimize the promotional activity on the item, which is now encapsulated in the variable V. Since the cost $c_{vi}$ of the promotions is now incorporated into the profit objective function, both pricing and promotion decisions can be optimized in a comprehensive manner.

The optimization of prices and promotions that yield the maximum profits $\pi$ can be performed using any mathematical optimization routine. A preferred technique, however, is the method of simulated annealing which is presented in W. Press et. al., *Numerical Recipes: The Art of Scientific Computing*, Cambridge University Press, New York (1992), which is hereby incorporated by reference. Because the modified demand model $q(\rho(p))$ may potentially be a set of coupled, multidimensional, nonlinear and discontinuous equations, simulated annealing is particularly suited for this type of optimization.

Once the optimal price and visibility for each item has been determined, the prices may be assigned to the items and the promotional activity which corresponds to the value of V may be implemented for each item. An example of possible output from the optimization process is provided in FIG. 12. As illustrated, the output comprises a list of items, an optimal price for each item, and an optimal level of visibility for each item. Thus, a pricing manager seeking to maximize profits is provided with list of prices and corresponding promotional activity Perceived Pricing The determination of the perceived prices involves taking the original price p and converting it to aperceived price $\rho$ that the shopper unconsciously believes the item has. Two preferred embodiments for making this conversion are presented below. Each embodiment presents a way to construct a routine that takes as input the price p and a set of parameters $B_{1\ldots N}$, and outputs a psychological price $\rho$.

First Preferred Embodiment of the Perceived Pricing Model

A first preferred embodiment of the perceived pricing model will be described below in conjunction with FIGS. 5–7.

(Step 1201)

First, the user chooses a set of base units $D_u$, which represent monetary units to which consumers are likely to be attuned in a given market. The units chosen will vary according to the local currency or currencies, common counting units in the market of interest, etc. An example of one possible set of base units $D_u$ that may be input by the user is denoted by reference numeral 150 in FIG. 6. It is further contemplated that an optimum set of base units $D_u$ can be determined by analyzing the chi-squared value that is yielded when the weighting function (discussed below) is fit to the sales data using the various possible combinations of base units for the local currency.

(Step 1202)

Figure 6:
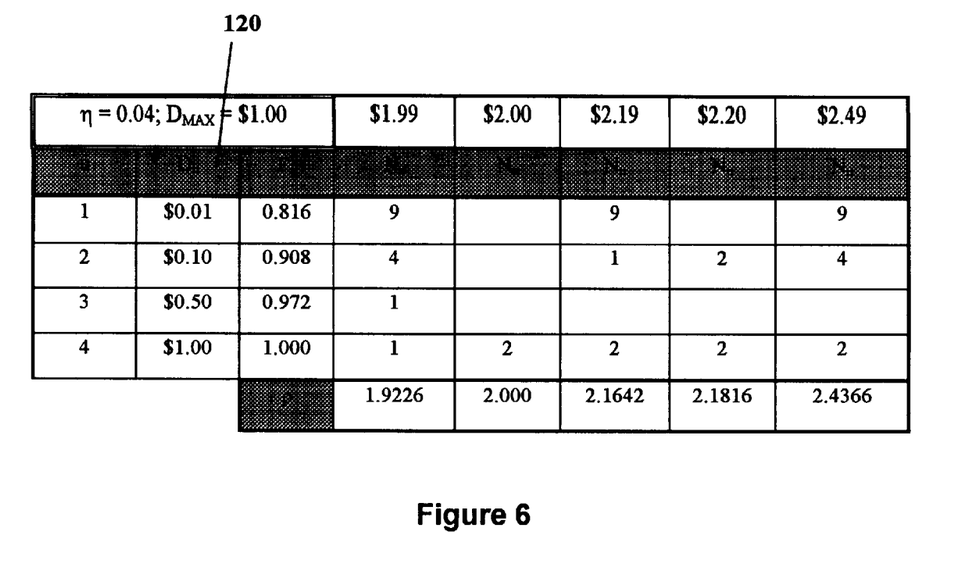
FIG. 6 is a table representing a data structure in memory in the first preferred embodiment of the routine for incorporating perceived prices into a demand model.

Next, as illustrated in FIG. 6, the price p is decomposed into the set of base units $D_u$ 150. The price p is decomposed by choosing a set of $N_u$ such that the following equation is satisfied:

$$P = \sum_u N_u D_u$$

As shown in FIG. 6, the price $1.99 is thus decomposed into 9 units of $0.01, 4 units of $0.10, 1 unit of $0.50 and 1 unit of $1,00.

(Step 1203)

Next, a weighting function having the general form $\Gamma_u = \Gamma_u(D_u; B_{1...N})$ is selected. Generally, the weighting function includes a set of parameters that is used to tune the perceived pricing model to the sales data. The weighting function will vary according to factors such as the desired ending number frequency. One possible form is $$\Gamma_u = 1 + \eta \ln\left(\frac{D_u}{D_{\text{MAX}}}\right)$$

In the form presented above, $D_{max}$ is the largest base unit in the list $D_u$ that is contained in the price p, and $\eta$ is the only tunable parameter.

(Step 1204)

The perceived price is next composed according to the following equation $$\rho = \sum_u N_u D_u \Gamma_u$$

Figure 7:
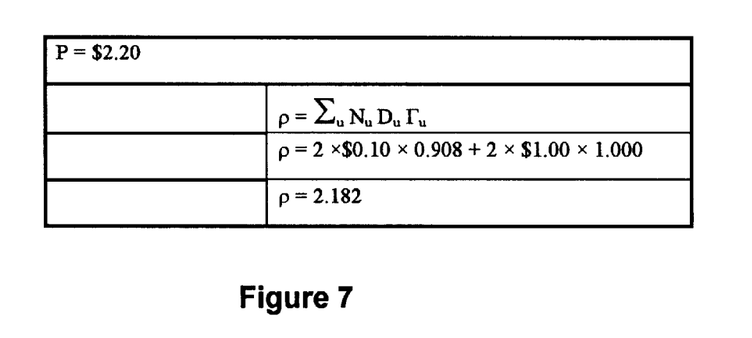
FIG. 7 is an example of a price decomposition used in a first preferred embodiment of the routine for incorporating perceived prices into a demand model.

The perceived price of $2.20 is determined in FIG. 7, which makes use of the price decomposition from FIG. 6. The parameter $\eta$ is obtained by fitting the modified demand function $q = Vq(\rho(p; \eta); X)$ to a particular sales history. This fitting would determine $\eta$, as well as all the other fitted parameters of the demand function, by determining the value of the parameters that minimizes the chi-squared fitting function.

Second Preferred Embodiment of the Perceived Pricing Model

Figure 8:
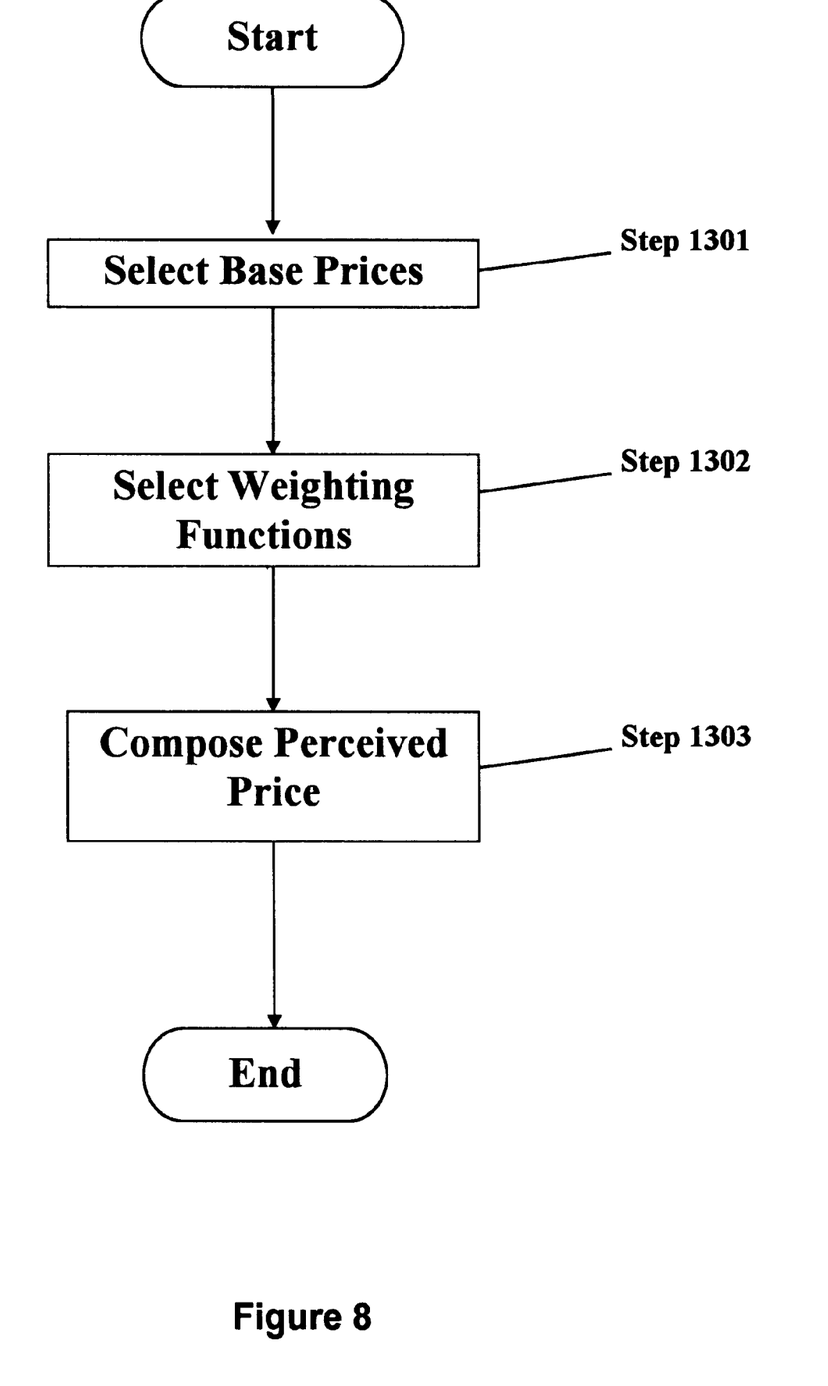
FIG. 8 is a flowchart of a second preferred embodiment of a routine for incorporating perceived prices into a demand model.
Figure 9:
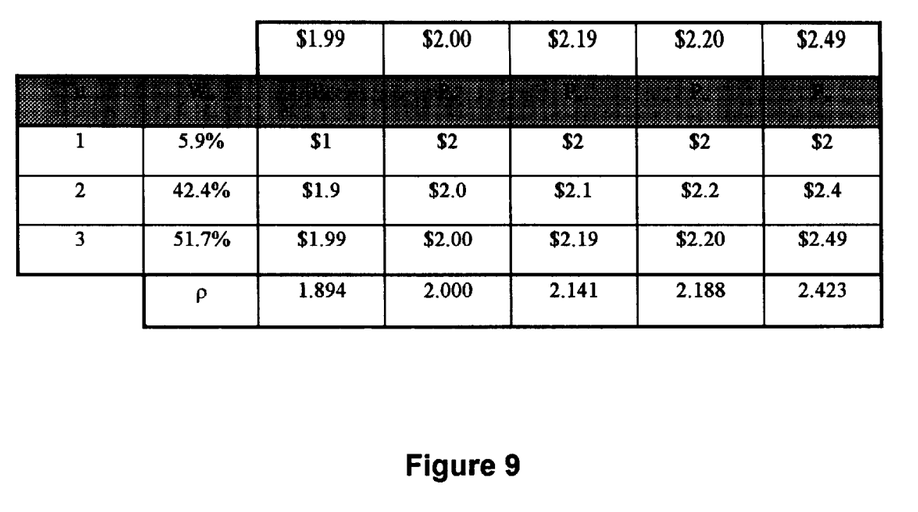
FIG. 9 is a table representing a data structure stored in memory of a second preferred embodiment of the routine for incorporating perceived prices into a demand model.
Figure 10:
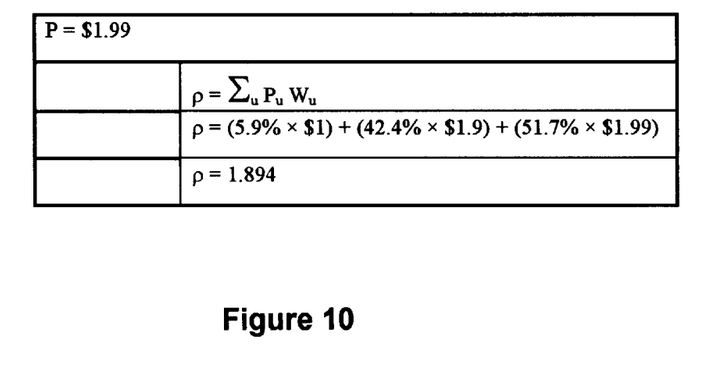
FIG. 10 is an example of a perceived price determined from the data from FIG. 9.
Figure 11:
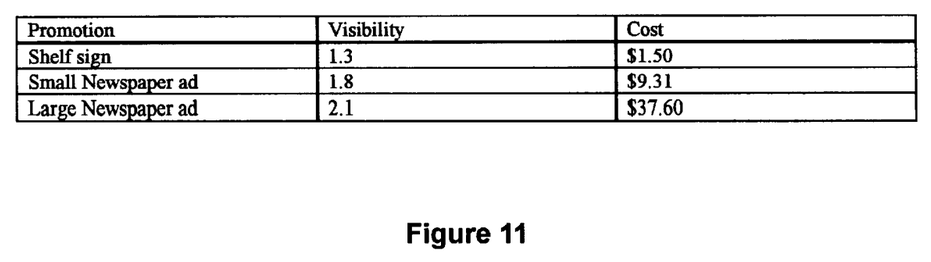
FIG. 11 is an example of a visibility table.

A second preferred embodiment of the perceived pricing model will be described below in conjunction with FIGS. 8–10. This second preferred embodiment is based on the recognized fact that consumers may perceive a price p as being perceptually similar to other prices.

(Step 1301)

First, the user selects a set of base prices $p_u$, based upon the price p. In general, the set of base prices $p_u$ is constructed by listing a set of perceptually similar prices for each price p. For example, a price of $1.99 might be perceived by consumers as $1, $1.9, or $1.99. The perceptually similar prices will necessarily be different for every price point; however, the example in FIG. 9 shows that the ignoring of successive digits is a process that is easily generalized into a set of base prices $p_u$. Other sets of base prices can, of course, be used. For example, a price of $2.69 could be perceived as $2, $2.6, $2.69, or $2.96.

(Step 1302)

At this step, the user selects an appropriate set of weighting functions $w_u$ that estimate the likelihood that a consumer would perceive the price p as $p_u$. The choice of weighting functions will depend upon the choice of perceptually similar prices from the previous step. In the example from above, where the perceptually similar prices were chosen by ignoring successive digits, the weighting functions can be constructed by estimating the percentage of shoppers that would successively ignore one or two digits, and applying this percentage as the weighting function $w_u$; this is demonstrated in FIG. 9. It should be appreciated that the weighting functions could take various other forms and be constructed in many different manners.

(Step 1303)

The perceived price $\rho$ is next composed according to the following form $$\rho = \sum_u W_u P_u$$

Thus, the perceived price represents an effective price that averages all the different perceptions that shoppers might have of the original price. A sample calculation is shown in FIG. 10, making use of the data in FIG. 9.

In both of the perceived pricing embodiments described above, it should be apparent that the perceived price is usually quite different from the actual price. For example, as shown in FIG. 9, a price of $1.99 is perceived by the consumer as being a price of $1.89. This is precisely the effect that the perceived pricing function is attempting to capture. When the perceived pricing method is used in a demand model, the true demand based on the perceived price of an item is used to optimize the true price. In calculating all other quantities, such as profits, sales, etc., the true price of the items is used.

Visibility Model

The choice of the visibility model is determined by the types of promotions that are run, and the general effects of those promotions on sales. In general, the visibility model describes how the demand for an item changes according to a promotion run on the item. For instance, if there is a sign in a store that displays a particular item's price, it may be expected that the demand for that item will increase. However, if there is a newspaper advertisement, the increase in demand will be different, and different yet again for a radio or television commercial. In addition, each of these promotional methods will have a particular cost associated with them.

Figure 12:
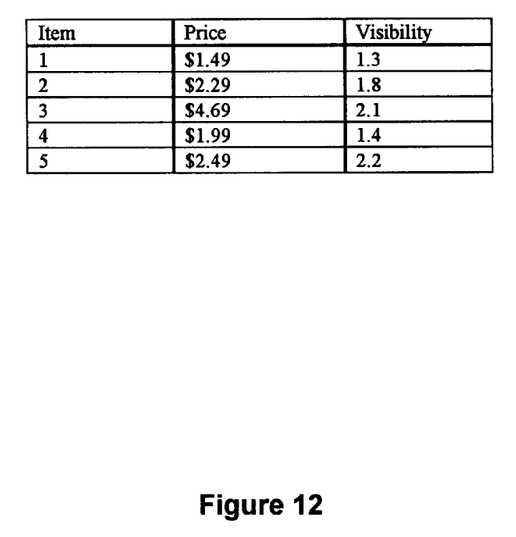
FIG. 12 is a table representing an example of a data structure stored in memory holding the results of the Optimizing Process.

In a preferred embodiment, the visibility model will be in the form of a table providing the relative increase in demand for an item at a given price vis-à-vis no promotion, along with the cost of the promotion. This table would thus provide a definition of the visibility cost function $c_v(V)$. An example of such a table is shown in FIG. 12, and can be constructed by analyzing in the sales history, the demand for individual items for given promotions. In many instances, a single promotion, such as a newspaper ad, will promote multiple items. In this case, the cost for the promotion should be divided up amongst all the items being promoted.

Once the visibility model has constructed, it can be incorporated into the demand model, which will then give the change in demand for an item based upon both its price and any promotions that modify this visibility.

Having thus described a preferred embodiment of the Method for Incorporating Psychological Effects into Demand Models, it should be apparent to those skilled in the art that certain advantages of the within method have been achieved. It should also be appreciated that numerous modifications, adaptations, and alternative embodiments thereof may be made within the scope and spirit of the present invention.

For example, the illustrated embodiments incorporate perceived pricing and visibility into a demand model; however, it should be appreciated that the method described herein may be extended to other psychological effects that may affect consumer demand.

The above description is presently the best contemplated mode of carrying out the invention. This illustration is made for the purposes of illustrating the general principles of the invention, and is not to be taken in a limiting sense. The scope of the invention is best determined by reference to the following claims.

What is claimed is:

1. A computer-implemented method for incorporating at least one psychological effect into a demand model comprising the steps of:

providing a data storage having past sales data;

selecting a demand model, said demand model including a plurality of parameters, each of which represents an operational decision, said plurality of parameters including a price parameter;

selecting at least one psychological effect that affects said operational decisions of said demand model;

constructing a psychological effect model to predict said at least one psychological effect of said operational decisions on potential consumers;

modifying said demand model with said psychological effect model; and tuning said modified demand model to said sales data to determine optimized values for said plurality of parameters, thereby obtaining an optimal set of operational decisions that takes into account said at least one psychological effect.

2. The computer-implemented method of claim 1, wherein said at least one psychological effect includes a perceived price which represents the consumers' perception of an actual price of an item, wherein an actual demand on an item having said actual price is affected by said perceived price.

3. The computer-implemented method of claim 2, wherein said at least one psychological effect further includes a visibility which represents the affect that promotional activities for an item have on said item's demand.

4. The computer-implemented method of claim 2, wherein said step of constructing a psychological effect model further includes the steps of:

choosing a set of base units for a market;

decomposing said actual price into said base units;

selecting a weighting function including at least one tunable parameter; and applying said weighting function to said decomposed actual price, thereby forming a perceived price model, wherein said psychological effect model includes said perceived price model.

5. The computer-implemented method of claim 4, wherein said step of modifying said demand model includes the step of:

substituting said price parameter in said demand model with said perceived price model.

6. The computer-implemented method of claim 2, wherein said step of constructing a psychological effect model further includes the steps of:

choosing a set of base prices based upon said actual price, said set of base prices including prices perceptually similar to said actual price;

selecting a weighting function to be applied to each of said prices in said set of base prices; and applying said weighting function to said set of base prices, thereby forming a perceived price model, wherein said psychological effect model includes said perceived price model.

7. The computer-implemented method of claim 6, wherein said step of modifying said demand model includes the step of:

substituting said price parameter in said demand model with said perceived price model.

8. The computer-implemented method of claim 2, wherein said step of constructing a psychological effect model further includes the steps of:

choosing a set of base prices based upon said actual price, said set of base prices including prices perceptually similar to said actual price;

selecting a weighting function to be applied to each of said prices in said set of base prices;

applying said weighting function to said set of base prices, thereby forming a first perceived price model;

choosing a set of base units for a market;

decomposing said actual price into said base units;

selecting a weighting function including at least one tunable parameter; and applying said weighting function to said decomposed actual price, thereby forming a second perceived price model; and combining said first perceived price model and said perceive price model, thereby forming a final perceived price model;

wherein said psychological effect model includes said final perceived price model.

9. The computer-implemented method of claim 8, wherein said step of modifying said demand model includes the step of:

multiplying said demand model by said visibility model.

10. The computer-implemented method of claim 2, wherein said step of constructing a psychological effect model further includes the step of:

constructing a visibility model from said sales data, said visibility model including a type of said promotional activity and its associated effect on said item's demand;

wherein said psychological effect model includes said visibility model.

11. The computer-implemented method of claim 1, wherein said at least one psychological effect includes a visibility which represents the affect that promotional activities for an item have on said item's demand.

12. A computer-readable storage medium, for use on a computer having a storage device for storing sales data, said computer-readable storage medium for storing program code for causing a computer to perform the steps of:

providing a data storage having past sales data;

selecting a demand model, said demand model including a plurality of parameters, each of which represents an operational decision, said plurality of parameters including a price parameter;

selecting at least one psychological effect that affects said operational decisions of said demand model;

constructing a psychological effect model to predict said at least one psychological effect of said operational decisions on potential consumers;

modifying said demand model with said psychological effect model; and tuning said modified demand model to said sales data to determine optimized values for said plurality of parameters, thereby obtaining an optimal set of operational decisions that takes into account said at least one psychological effect.

13. The computer-readable storage medium of claim 12, wherein said at least one psychological effect includes a perceived price which represents the consumers' perception of an actual price of an item, wherein an actual demand on an item having said actual price is affected by said perceived price.

14. The computer-readable storage medium of claim 13, wherein said at least one psychological effect further includes a visibility which represents the affect that promotional activities for an item have on said item's demand.

15. The computer-readable storage medium of claim 12 wherein said at least one psychological effect includes a visibility which represents the affect that promotional activities for an item have on said item's demand.

16. The computer-readable storage medium of claim 15, wherein said step of constructing a psychological effect model further includes the steps of:

choosing a set of base units for a local currency;

decomposing said actual price into said base units;

selecting a weighting function including at least one tunable parameter; and applying said weighting function to said decomposed actual price, thereby forming a perceived price model, wherein said psychological effect model includes said perceived price model.

17. The computer-readable storage medium of claim 16, wherein said step of modifying said demand model includes the step of:

substituting said price parameter in said demand model with said perceived price model.

18. The computer-readable storage medium of claim 15, wherein said step of constructing a psychological effect model further includes the steps of:

choosing a set of base prices based upon said actual price, said set of base prices including prices perceptually similar to said actual price;

selecting a weighting function to be applied to each of said prices in said set of base prices;

applying said weighting function to said set of base prices, thereby forming a perceived price model, wherein said psychological effect model includes said perceived price model.

19. The computer-readable storage medium of claim 15, wherein said step of constructing a psychological effect model further includes the step of:

constructing a visibility model from said sales data, said visibility model including a type of said promotional activity and its associated effect on said item's demand;

wherein said psychological effect model includes said visibility model.

20. The computer-readable storage medium of claim 19, wherein said step of modifying said demand model includes the step of:

multiplying said demand model by said visibility model.

21. A system for incorporating psychological effects into a demand model, said system for use with a storage device having sales data stored thereon, said system comprising:

means for selecting a demand model, said demand model including a plurality of parameters, each of which represents an operational decision, said plurality of parameters including a price parameter;

means for selecting at least one psychological effect that affects said operational decisions of said demand model;

means for constructing a psychological effect model to predict said at least one psychological effect of said operational decisions on potential consumers;

means for modifying said demand model with said psychological effect model; and means for tuning said modified demand model to said sales data to determine optimized values for said plurality of parameters, thereby obtaining an optimal set of operational decisions that takes into account said at least one psychological effect.

* * * * *